Figure 1:
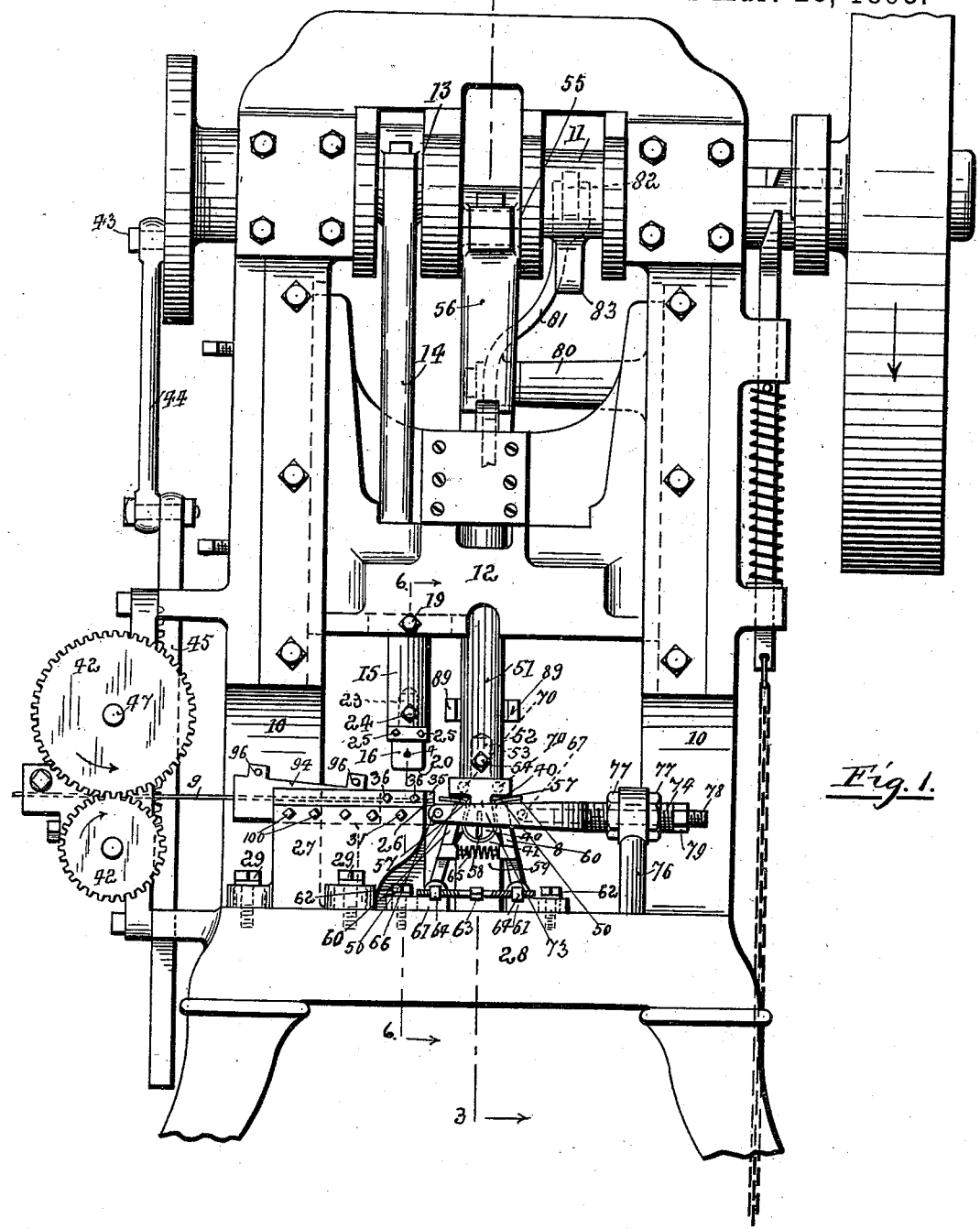

(No Model.) 4 Sheets—Sheet 1.

S. VANSTONE.
MACHINE FOR MAKING PIPE CLIPS.

No. 494,535. Patented Mar. 28, 1893.

Witnesses.
Charles Hannigan
Alba R. Abbott

Inventor.
Samuel Vanstone
by S. Scholfield
Atty.

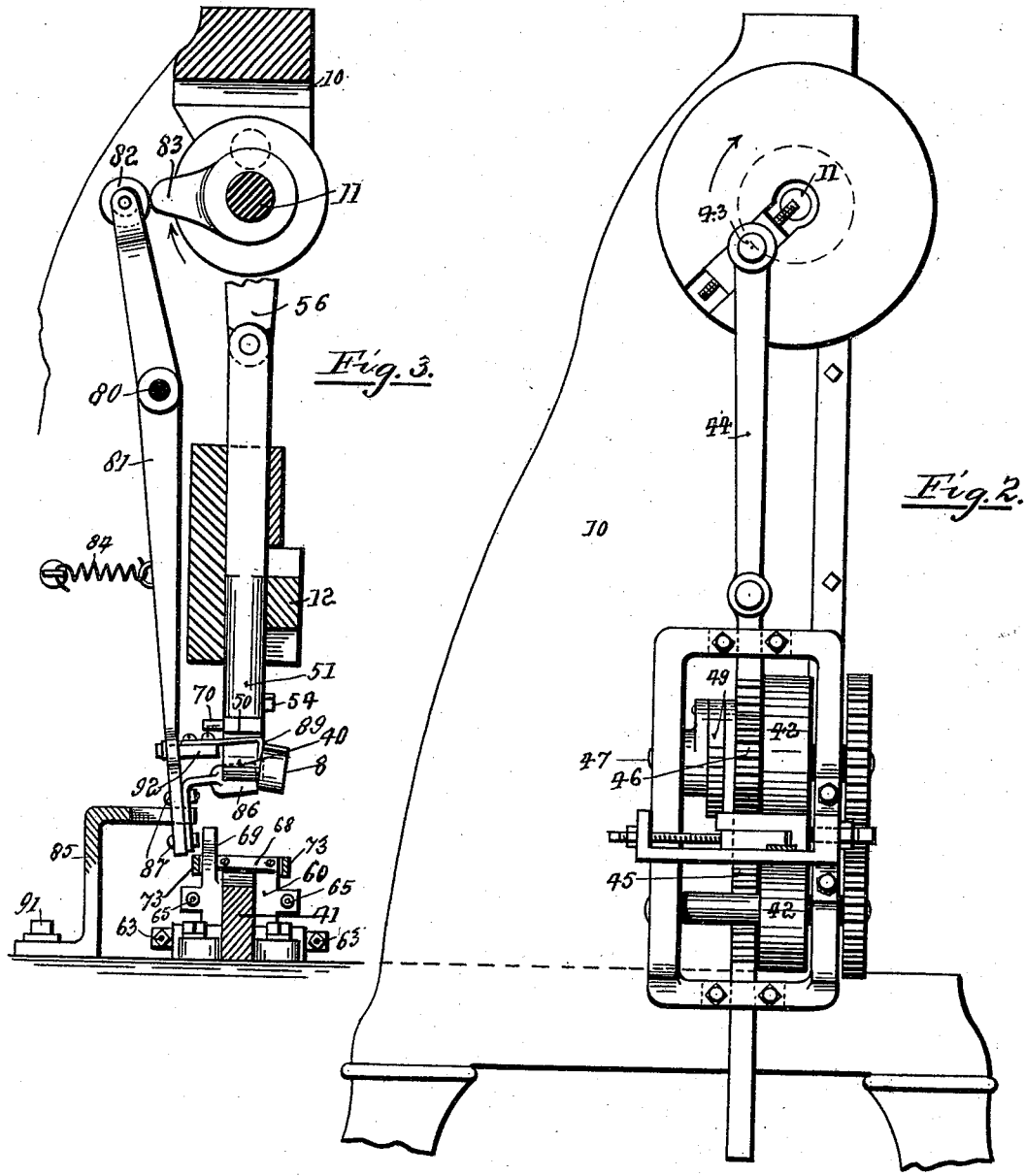

(No Model.) 4 Sheets—Sheet 3.
S. VANSTONE.
MACHINE FOR MAKING PIPE CLIPS.
No. 494,535. Patented Mar. 28, 1893.
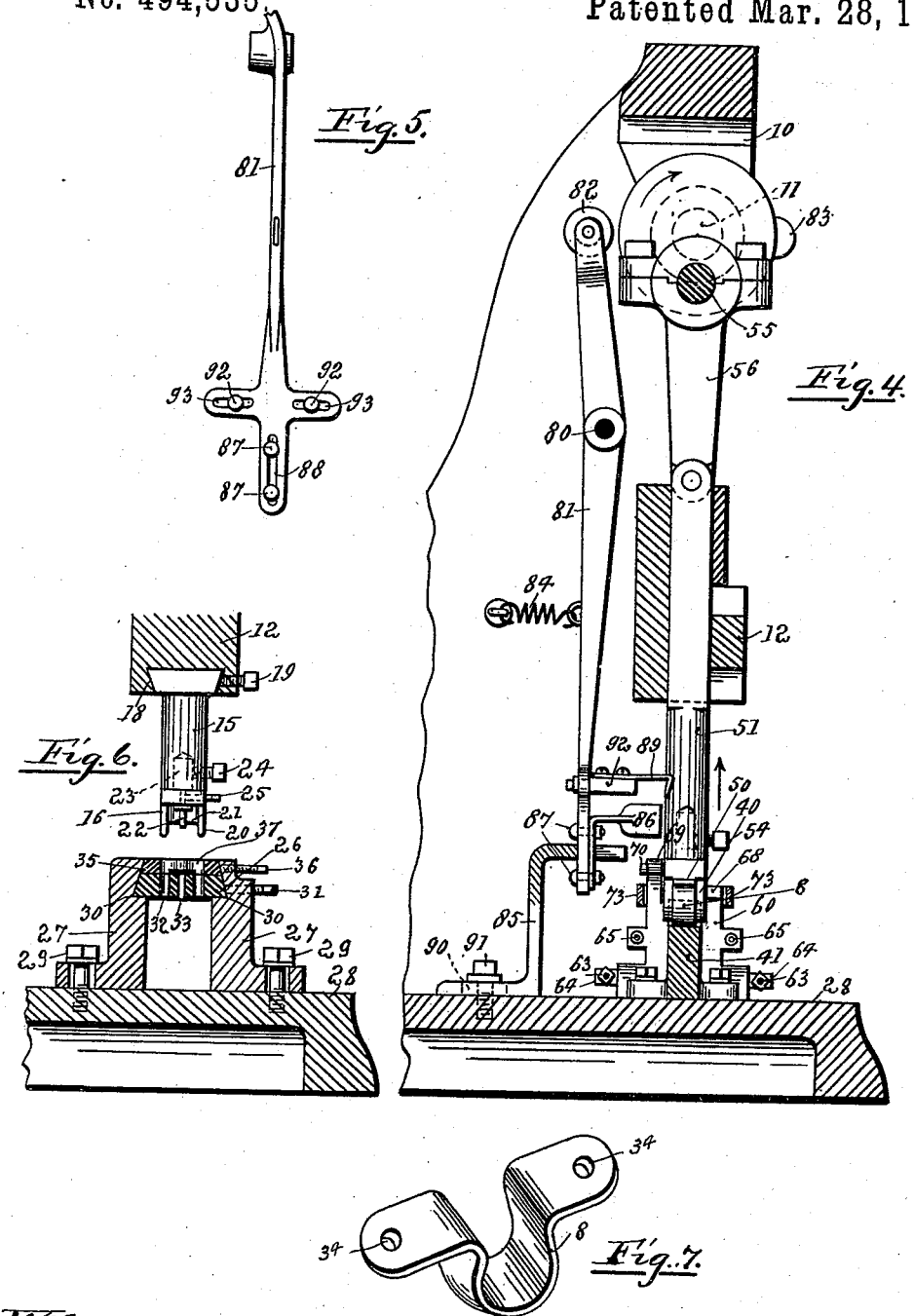

(No Model.) 4 Sheets—Sheet 4.
S. VANSTONE.
MACHINE FOR MAKING PIPE CLIPS.
No. 494,535. Patented Mar. 28, 1893.
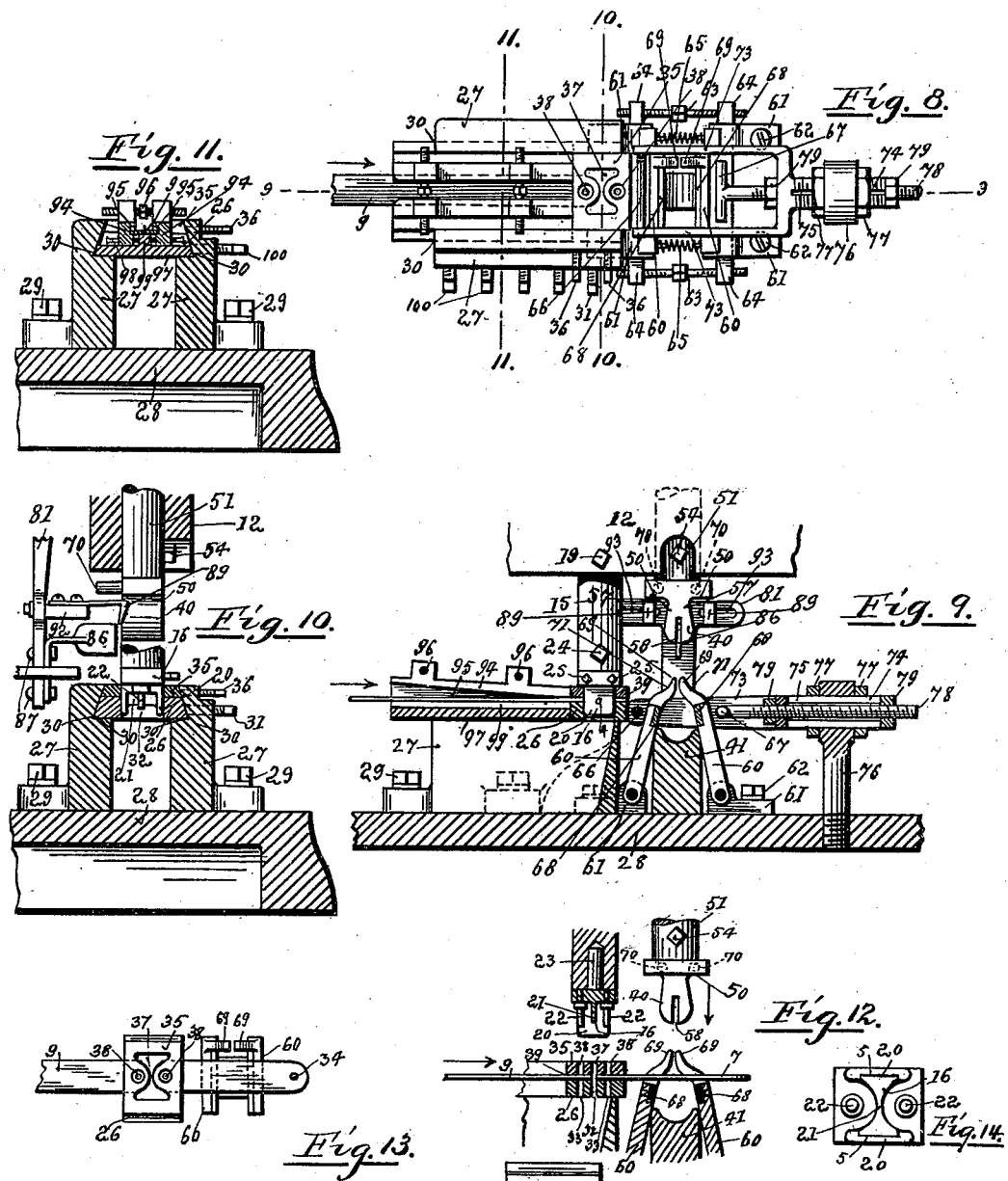
Witnesses:
Charles Hannigan
Alba R. Abbott
Inventor:
Samuel Vanstone
by S. Scholfield
Atty.

UNITED STATES PATENT OFFICE.

SAMUEL VANSTONE, OF PROVIDENCE, RHODE ISLAND, ASSIGNOR OF THREE-FOURTHS TO WILLIAM K. ATWOOD AND JOSEPH NICHOLS, OF SAME PLACE.

MACHINE FOR MAKING PIPE-CLIPS.

SPECIFICATION forming part of Letters Patent No. 494,535, dated March 28, 1893.

Application filed July 21, 1892. Serial No. 440,797. (No model.)

*To all whom it may concern:*

Be it known that I, SAMUEL VANSTONE, a citizen of the United States, residing at Providence, in the State of Rhode Island, have invented a new and useful Improvement in Machines for Making Pipe-Clips, of which the following is a specification.

My invention relates to a machine for making spring clips for attaching pipes to the walls of a building, and it consists in the improved construction and arrangement of the several parts of the machine, and in the improved construction and operation of the dies, as hereinafter fully set forth.

Figure 1, represents a front elevation of the machine. Fig. 2, represents a side elevation, showing the feeding mechanism. Fig. 3, represents a vertical section taken in the line 3, 3, of Fig. 1, showing the plunger head in its highest position. Fig. 4, represents the same vertical section, showing the plunger head in its lowest position. Fig. 5, represents a rear view of the lower portion of the clearing lever. Fig. 6, represents a vertical section taken in the line 6, 6, of Fig. 1. Fig. 7, represents a perspective view of the spring-clip. Fig. 8, represents a top view of the dies and the attached parts separate from the die holding bed. Fig. 9, represents a vertical section taken in the line 9, 9, of Fig. 8. Fig. 10, represents a vertical section taken in the line 10, 10, of Fig. 8. Fig. 11, represents a vertical section taken in the line 11, 11, of Fig. 8. Fig. 12, represents a detail section showing the relative position of the several tools employed. Fig. 13, represents a detail top view of the cutting off and punching die, and the bending jaws. Fig. 14, represents an enlarged under view of the cutting off plunger. Fig. 15, represents an enlarged top view of the cutting off die.

In the accompanying drawings, 10 represents the frame of the machine, 11 the driving shaft, and 12 the plunger head, which is connected with the crank 13, by means of the connecting rod 14. The plunger head 12 is provided with the adjustable holder 15 for the cutting off plunger 16 and the circular punches 22, the said holder being held in the dovetailed groove 18, by means of the set screw 19. The cutting off plunger 16, is provided with the downwardly extending lips 20, and the cutting off punch 21, and also with the punches 22, 22, and is held in the socket 23, of the holder 15, by means of the set screw 24, the punches 22, being secured to the cutting off plunger 16, by means of the set screws 25, 25, so that, the said punches will partake of the up and down movement of the plunger 16, and the punch 21 is removably held in the grooves 5, 5, of the lips 20, by means of the pin 4, shown in Fig. 1.

The cutting off and punching die 26, is held in the dovetailed groove 30, formed between the parallel pieces 27, 27, which are secured to the bed 28, by means of the bolts 29, and the said die is held in its proper position in the groove 30, by means of the set screw 31. The die 26 shown in plan view in Fig. 15, is provided with the opening 32, adapted to receive the cutting off plunger 16, shown in Fig. 14, so as to cut off the clip blanks with rounded ends, and with the perforations 33, 33, at each side of the opening 32, to receive the punches 22, for making the holes 34 in the ends of the blank, and over the die 26 in the groove 30, is placed the guiding plate 35, the said plate being held in position over the die by means of the set screws 36, and provided with the opening 37, adapted for the passage of the cutting off plunger to the die, and with the openings 38, adapted for the passage of the punches 22, the said plate being also provided with the groove 39, adapted to receive and guide the strip of iron 9, from which the clips are to be formed, the said strip being fed through the groove 39, to the bending plunger 40, and die 41, by means of the geared feed rolls 42, 42, which are operated from the shaft 11, by means of the adjustable crank 43, connecting rod 44, and the reciprocating rack 45, the said rack being made to engage with the gear 46, which is loose on the shaft 47 of the upper feed roll 42; and to the side of the said gear is attached the dog 49, which engages with the ratchet wheel 48, secured to the shaft 47, thus causing the forward movement of the strip 9, at each revolution of the shaft 11.

The bending plunger 40, is secured to the vertically reciprocating bar 51, by means of the shank 52, which enters the socket 53, and is secured therein by means of the set screw 54, the said bar 51 having a bearing in the plunger head 12, which forms a guide for the same, and being connected with the crank 55, on the shaft 11, by means of the connecting rod 56.

The bending plunger 40, is narrowed at its base to form opposite recesses 57 in order that the clip 8 may be contracted so as to spring upon the pipe and hold itself in position while it is being secured to the wall of the building, and the rounded end of the said plunger, is provided with a slot 58, which is adapted to receive the clearer for forcing the finished clip from the plunger.

The concave die 41, is attached to the bed 28, and serves to form the rounded curve of the clip, and at the opposite sides of the die 41 are placed the pivoted arms 60, which serve to bend the sides of the clip 8 inward, into the recesses 57, at the sides of the bending plunger, the said arms 60, being pivoted to the adjustable blocks 61, 61, which are held in position by means of the screws 62, the adjustment of the said blocks being effected by means of the right and left hand screws 63 at each side of the die 41, the said screws passing through the studs 64, attached to the blocks 61. Compression springs 65 are arranged at the opposite sides of the die 41, which serve to throw the arms 60 outward, against the rests 66, and 67, which are made adjustable and serve to limit the outward movement of the said arms from the die 41. The arms 60 at their upper ends support the bars 68, of hardened steel, over which the blank 7 is to be bent, and forced downward into the forming die 41, by the downward movement of the bending plunger 40, the said bars 68 being detachably secured to the said arms by means of screws, or otherwise; and each of the said pivoted arms 60, are provided with an inwardly projecting horn 69, adapted to engage each with one of the pins 70, which project from the rear side of the base of the bending plunger 40, so that upon the downward movement of the said bending plunger the pins 70, by coming in contact with the inclined surface 71, of the horns 69, will force the bars 68, inward, so as to cause the inward bending of the sides of the clip 8 into the recesses 57 of the bending plunger.

The rest 66, is held between the arms 73, which are connected to a hollow screw threaded shank 74, provided with a guiding slot 75, the said shank being held in the standard 76, and adjusted therein, by means of the opposite nuts 77, 77, and the opposite rest 67, is provided with the screw threaded shank 78, which is adjustably held in the hollow of the shank 74, by means of the opposite nuts 79, and by means of the adjustable rests 66 and 67, the pivoted arms may be properly adjusted for bending clips of various sizes.

Upon the stud 80 at the back of the machine, is pivoted the clearer lever 81, provided at its upper end with the roller 82, which engages with the cam 83, upon the shaft 11; the said roller being held in contact with the said cam, by means of the spring 84, the lower end of the clearer lever being loosely held by the forked guide 85, which is adjustably secured to the bed 28, by means of the slot 90 and screw 91, and serves to limit the backward movement of the clearer lever. To the lower end of the clearer lever is attached the central clearer 86, which is adapted to enter the slot 58 in the bending plunger 40, the said clearer being adjustably held by means of the bolts 87, which pass through the vertical slot 88, in the clearer lever. The side clearers 89 are attached to the studs 92, which are adjustably held in the horizontal slots 93 of the clearer lever, by means of the nuts 72, and by this means the clearers are made adjustable for clips of different sizes.

The iron strip 9 is guided in its entrance to the machine, by means of the adjustable side guides 94, the said guides being provided with the groove 95, adapted to receive the edge of the strip, and with the right and left hand screws 96, which are adapted to adjust the guides 94, for strips 9 of different widths, the said guides being held in position upon the plate 97, by means of the wires 98, which pass loosely through suitable perforations made in the said guides, and are firmly secured in the longitudinal rib 99 of the plate 97, the said plate being suitably held in the grooves 30, of the parallel pieces 27, by means of the set screws 100.

The operation of the machine will be as follows: Upon starting the machine, the strip 9 will be fed forward over the cutting off and punching die 26, so that the blank 7 will be punched and severed from the strip 9, upon the downward movement of the cutting-off plunger 16, and the forward end of the succeeding blank, will be punched, preparatory to the subsequent feeding movement of the rolls 42. The blank 7 when cut off, will rest in proper position over the forming die 41, so that upon the downward movement of the bending plunger 40, the blank will be bent in the required form, as shown in Fig. 1, the engagement of the pins 70, with the horns 69, of the pivoted arms 60, serving to force the bars 68 inwardly, at the completion of the downward movement of the bending plunger, thus serving to force the sides of the clip inwardly, into the recesses 57, of the bending plunger, whereby the sides of the clip 8 will be caused to clasp the pipe, with spring pressure; the shoulders 50 of the bending plunger, operating at the same time, to bend down the ears of the clip, as shown in Fig. 1, and the inward bending of the sides of the clip 8 against the recessed sides of the bending plunger 40, will cause the withdrawal of the clip with the said plunger, upon its succeeding upward movement, and upon the completion of the said upward movement, the clearers 86 and 89, will be brought forward by the action of the cam 83, to cause the removal of the finished clip 8, from the bending plunger as shown in Fig. 3.

In the construction of the machine, the concave die 41, may be omitted, if desired, the opposite pivoted arms 60, being sufficient to cause the turning of the blank around the bending plunger.

I claim as my invention—

1. In a machine for making pipe clips, the combination with the cutting off plunger provided with the opposite punches, of the die provided with the perforations adapted to receive the punches, and the intervening perforation adapted to receive the cutting off plunger, and the perforated plate provided with the guiding groove for the metal strip, substantially as described.

2. In a machine for making pipe-clips, the combination with the cutting off plunger provided with the opposite punches, and the die provided with the perforations adapted to receive the punches and the intervening perforation adapted to receive the cutting off plunger, of the adjustable grooved side guides, and the grooved perforated plate adapted to guide the metal strip to its proper position over the cutting off die, substantially as described.

3. In a machine for making pipe-clips, the combination with the bending plunger having opposite recesses at its base, of the pivoted arms, and means for drawing the said arms together to press the sides of the clip into the recesses of the bending plunger, substantially as described.

4. In a machine for making pipe-clips, the combination with the bending plunger having opposite recesses at its base, of the adjustable pivoted arms, means for drawing the said arms together to press the sides of the clip into the recesses of the bending plunger, the spring for throwing the arms outward, and the adjustable rests for limiting the outward movement of the arms, substantially as described.

5. In a machine for making pipe-clips, the combination with the bending plunger provided with the opposite recesses at its base and the central groove for the clearer, of the pivoted arms, means for drawing the said arms together to press the sides of the clip into the recesses, of the bending plunger, means for operating the bending plunger, and the clearer lever provided with the adjustable clearers adapted to force the finished clip laterally from the bending plunger, substantially as described.

SAMUEL VANSTONE.

Witnesses:
SOCRATES SCHOLFIELD,
ALBA R. ABBOTT.